Figure 1:
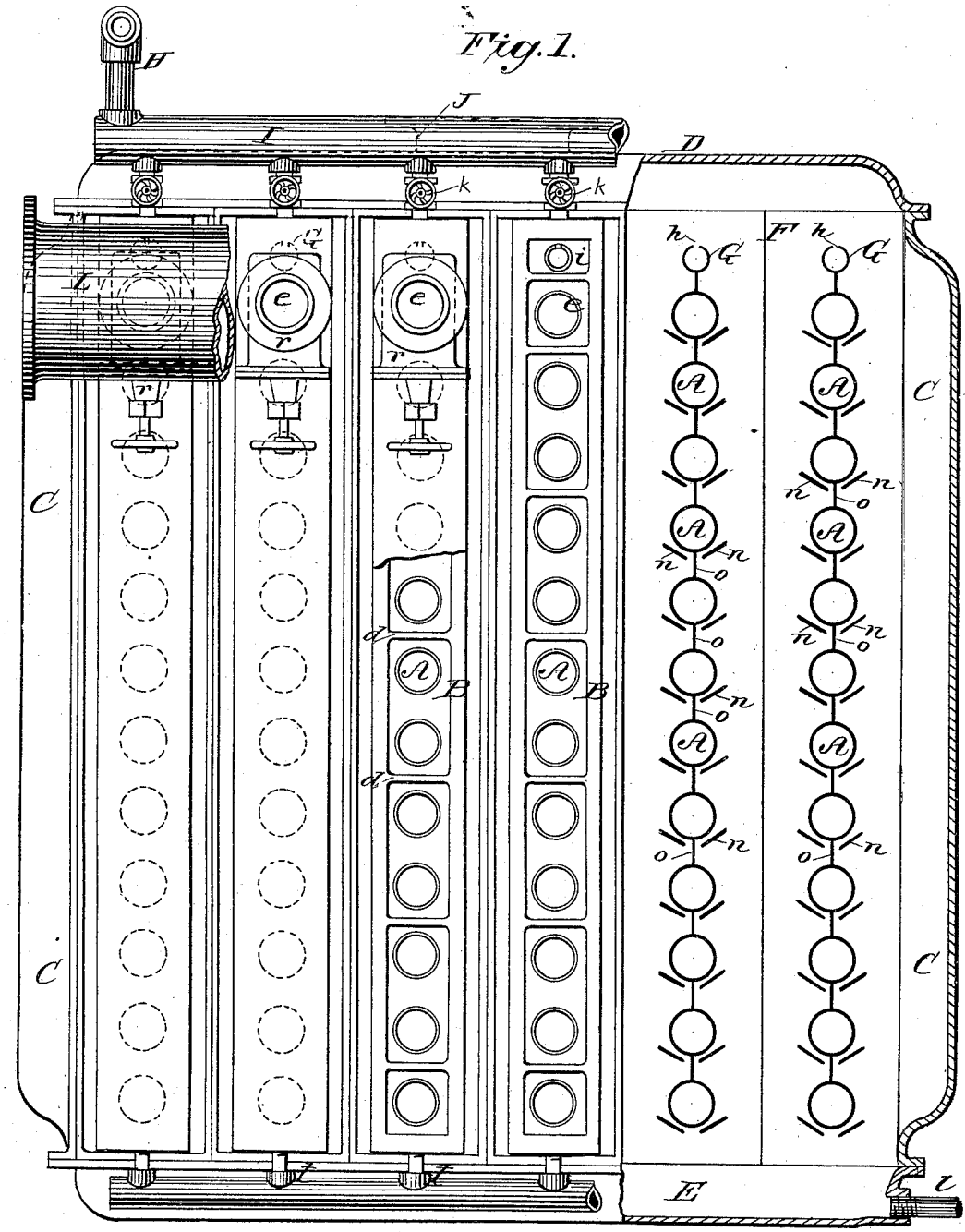

(No Model.) 5 Sheets—Sheet 3.

T. GAUNT.
APPARATUS FOR EVAPORATING LIQUIDS.

No. 409,572. Patented Aug. 20, 1889.

WITNESSES:

INVENTOR
Thomas Gaunt
BY
Chas. N. Forbes
ATTORNEY (No Model.) 5 Sheets—Sheet 4.
T. GAUNT.
APPARATUS FOR EVAPORATING LIQUIDS.
No. 409,572. Patented Aug. 20, 1889.
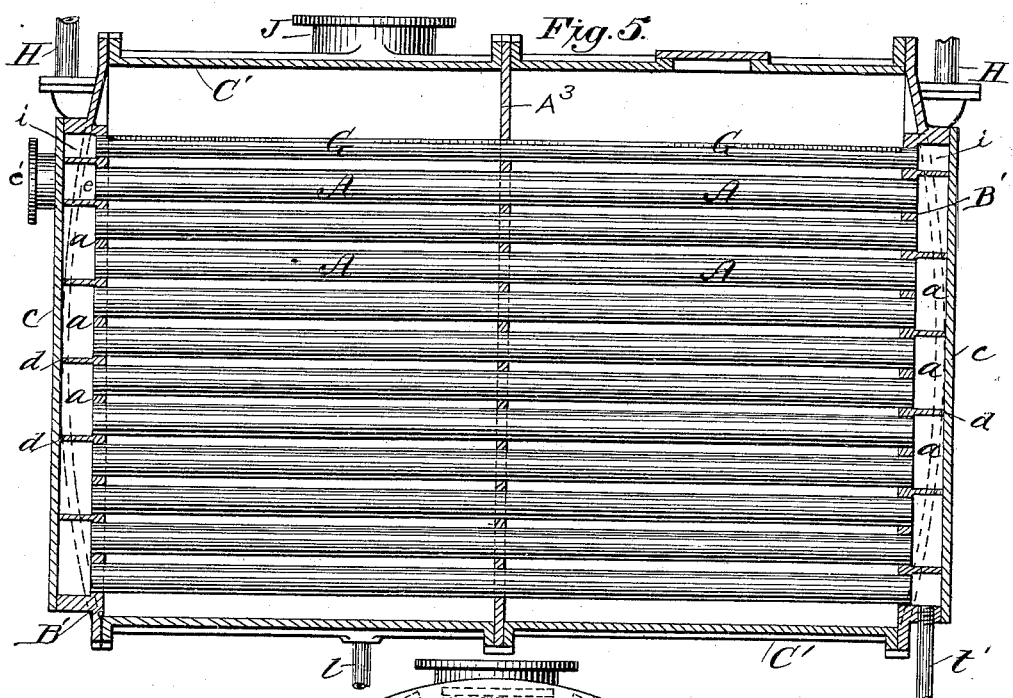
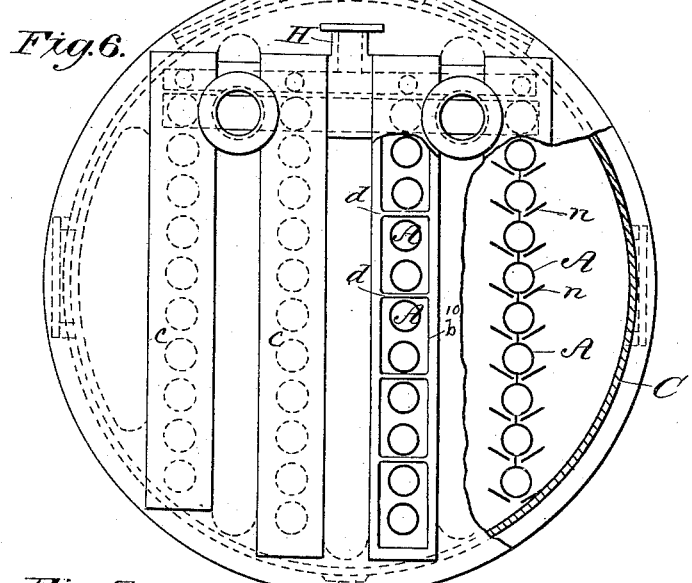
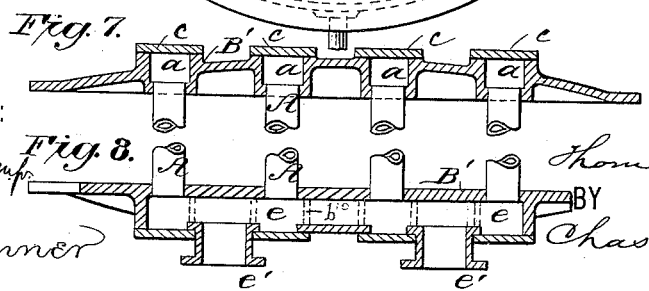
WITNESSES:
INVENTOR
Thomas Gaunt
BY
Chas. N. Forbes
ATTORNEY (No Model.) 5 Sheets—Sheet 5.
T. GAUNT.
APPARATUS FOR EVAPORATING LIQUIDS.
No. 409,572. Patented Aug. 20, 1889.
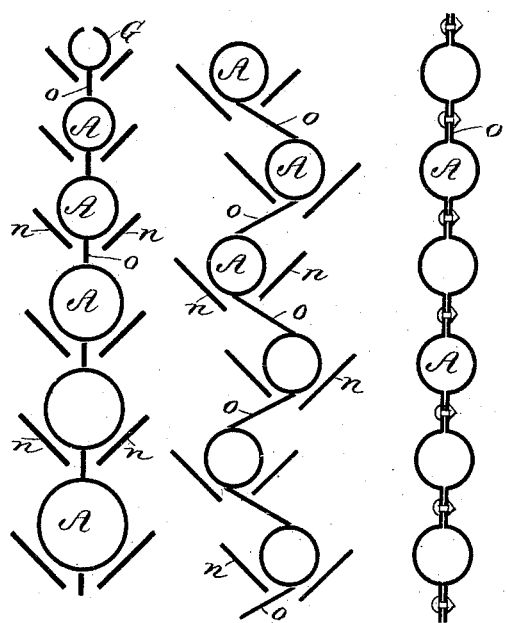
Fig. 9. Fig. 10. Fig. 11. Fig. 12.
Fig. 15.
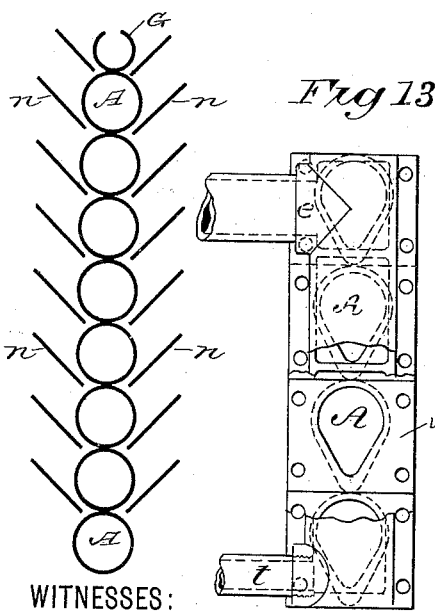
Fig. 13. Fig. 14.
WITNESSES:
INVENTOR
Thomas Gaunt
BY
Chas. N. Forbes
ATTORNEY

UNITED STATES PATENT OFFICE.

THOMAS GAUNT, OF BROOKLYN, NEW YORK.

APPARATUS FOR EVAPORATING LIQUIDS.

SPECIFICATION forming part of Letters Patent No. 409,572, dated August 20, 1889.

Application filed December 22, 1887. Serial No. 258,655. (No model.)

*To all whom it may concern:*

Be it known that I, THOMAS GAUNT, a citizen of the United States, residing at the city of Brooklyn, county of Kings, and State of New York, have invented certain new and useful Improvements in Apparatus for Evaporating Liquids, of which the following is a specification.

This invention relates to apparatus for evaporating or distilling liquids, and is especially adapted, among other things, to be used for the concentration of sugar, soda, and other solutions, and also for the refining or the distillation of glycerine, oils, and other analogous substances.

My invention has for its object to provide an apparatus in which the concentration, refining, or distillation of liquid substances may be effected on the surface of the apparatus in a shorter time and at a less expense than heretofore, my improved apparatus being simple in construction and, as shown, being made in sections, whereby it may be made of any desired size by uniting together any desired number of sections, and whereby the apparatus may be readily taken apart for repairs, shipment, and other purposes.

In accordance with my invention the liquid or fluid substance to be treated is spread over and upon the evaporating-surface in a substantially continuous thin sheet, so that the heating medium—which may be steam, caloric, water, or other liquid or gas, according to the nature of the substance to be treated—may act upon a large surface of the material with a maximum result.

My improved apparatus may be coupled or connected together, as will be described, to produce a double, triple, or other multiple effect—that is, the products of evaporation or distillation from one apparatus being employed as the heating agent or medium for another or second apparatus.

My invention in apparatus for evaporating liquids and other substances therefore consists, essentially, in an undulatory evaporating-surface and a feed or delivery for the liquid to be treated, combined with a series of returning-surfaces co-operating with the said evaporating-surface to receive and return the liquid thereto, substantially as will be described.

Other features of my invention will be pointed out in the claims at the end of this specification.

Figure 2:
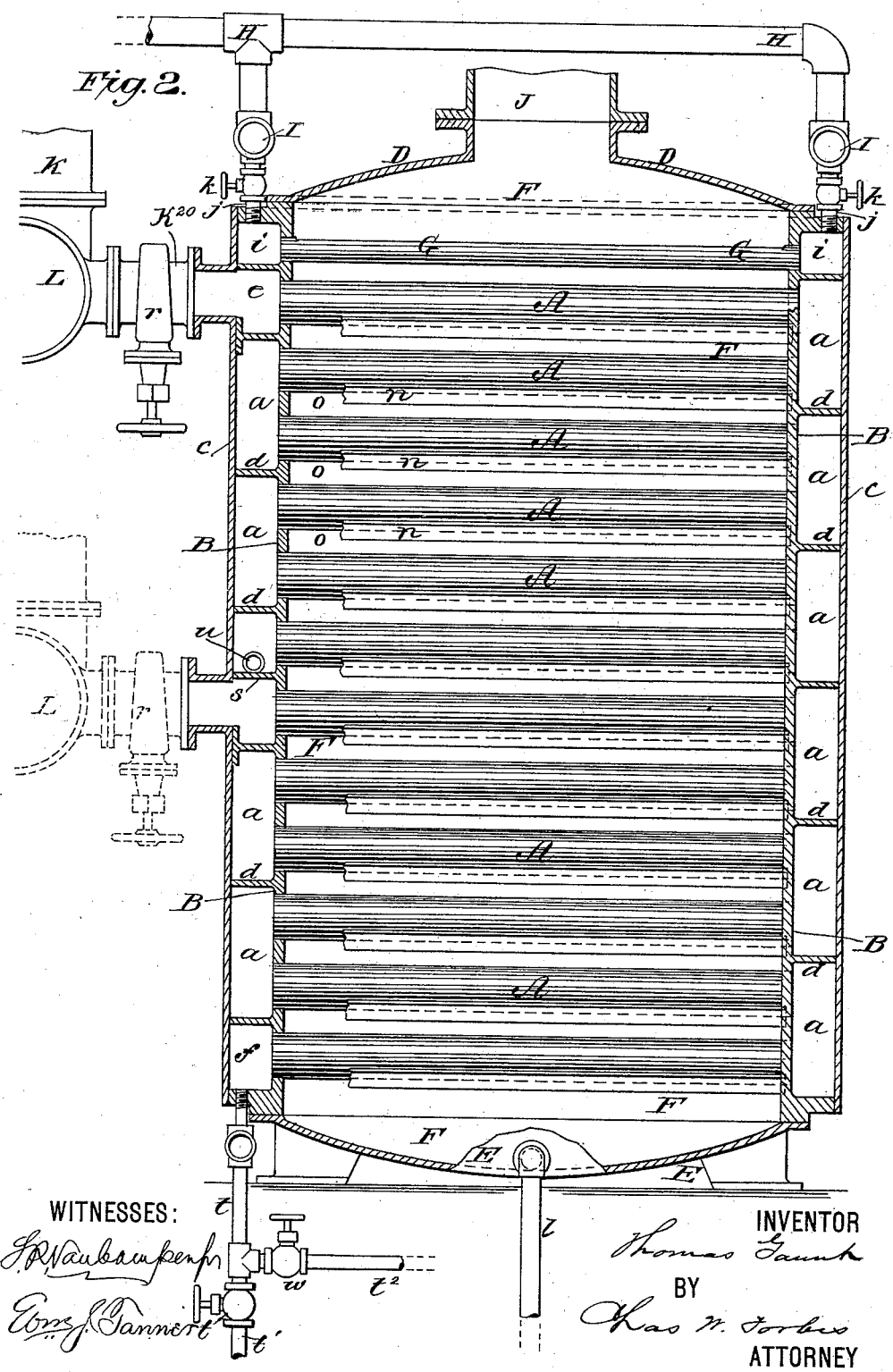
Figure 3:
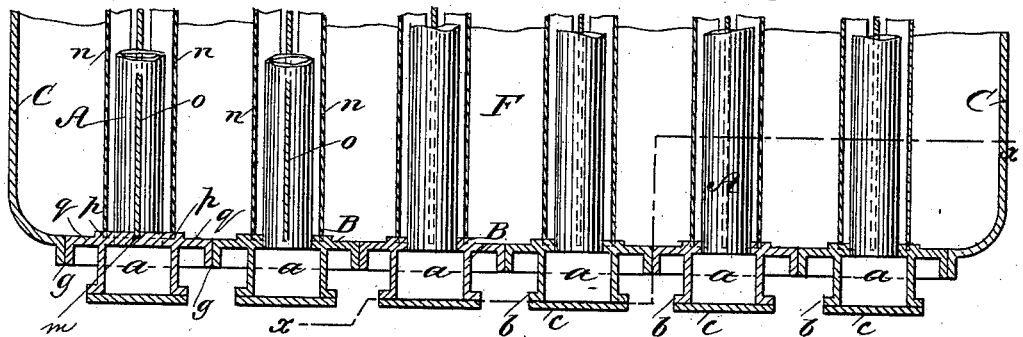
Figure 4:
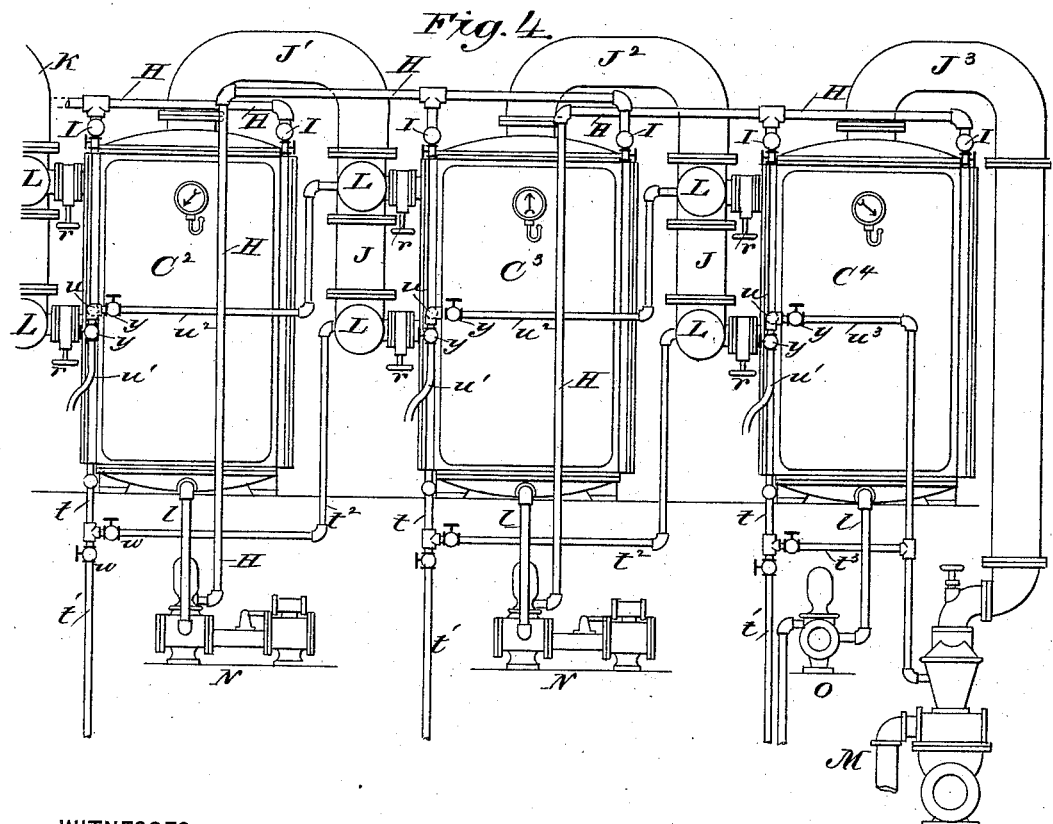

Figure 1 is an elevation, partially broken out and partially in section in line $x\ x$, Fig. 3, of an apparatus embodying my invention; Fig. 2, a transverse section of Fig. 1 between two adjacent rows of pipes or tubes; Fig. 3, a partial horizontal section of the same; Fig. 4, a diagram of the evaporating apparatus and their pipe-connections, whereby a "multiple-effect" system is practiced; Fig. 5, a longitudinal section of a modified form of the apparatus shown in Fig. 6; Fig. 6, an end elevation, partially broken out and partially in section, of the apparatus shown in Fig. 5; Figs. 7 and 8, partial horizontal sections through the heads of said apparatus; and Figs. 9 to 15, inclusive, detail views of various modifications in the construction or arrangement of the evaporating-tubes.

My improved apparatus will preferably be composed of a number of independent sections, each constituting in itself a distinct apparatus. Each section referred to consists, as herein shown in Figs. 1, 2, and 3, of, preferably, cast-iron headers B, between which the evaporating-surface is located, the said headers having flanges $b$, (see Fig. 3), against which are bolted, or otherwise secured, covers $c$, the latter forming with the said flanges at each side of the apparatus a chamber which may be divided, as shown, into a number of smaller chambers or pockets $a$ by the division-plates $d$, preferably cast integral with the header. The evaporating-surface is preferably composed of a series of substantially horizontal tubes or pipes A, arranged, as shown, in a substantially vertical plane, to form an evaporating-surface having an undulatory outline, the said tubes being herein represented as having their ends expanded or secured into holes in the headers B, and being so connected with the chambers or pockets $a$, as shown in Fig. 2, as to form a continuous passage from a point, as $e$, at or near the top of the apparatus, to a point, as $f$, at the bottom thereof.

The evaporating-surface of each section has co-operating with it a liquid feed or supply, (herein shown) as a tube G, communicating preferably at each end, as shown, with supply-chambers $i$ in the headers B, and provided at its upper side with a slot $h$, (see Fig. 1,) extended substantially the length of the said tube, the said slot, which constitutes the discharge-outlet of the feed or supply tube, permitting the liquid or fluid substance to be discharged upon the evaporating-surface in a continuous thin sheet. Each header B is provided with side flanges $g$, (see Fig. 3,) which abut against each other when two or more sections are used, the flanges $g$ of adjacent or abutting headers being in practice bolted or otherwise secured together in the usual manner. The headers form two sides or ends of a vapor-case, the two other sides and top and bottom thereof being composed of separate plates bolted to the headers, thus inclosing the evaporating-surface in a vapor-case, and, as shown, the space F so formed is common to all the parts of the structure.

The delivery tube or pipe G of each section is supplied, as shown, through the chambers $i$ from pipes H, connected to the source of supply and communicating with the said chambers by manifolds I, provided with cocks $k$ and nozzles $j$ extended into said chambers. The liquid, it will be noticed, enters both ends of the feed or supply G, thereby insuring a uniform discharge and consequent spread of liquid throughout the length of the evaporating-surface. The liquid may be fed from its source of supply to the tube G from beneath the latter, if desired, so that it will gradually rise therein and overflow free from pressure.

The flow of liquid over the evaporating-surface may be controlled by the cocks $k$, and may be increased or decreased, as desired; or the said supply may be entirely cut off from one or more of the series of evaporating-surfaces, as desired. In practice the cocks controlling the flow of liquid are first opened to cover the evaporating-surface with liquid before the heating medium is turned on or admitted to the apparatus, so that when the heat is admitted to the apparatus the evaporating-surface will not become dry, but will be covered by the sheet of liquid, thus preventing the formation of an incrustation on the said evaporating-surface, thereby maintaining the said surface clean and in normal or proper condition to obtain a maximum evaporating effect. By preventing the formation of the incrustation referred to my improved apparatus may be used a long time without necessitating cleansing. The tubes or pipes A will preferably be connected together by bridges $o$, having their ends fitted into substantially vertical grooves $m$ (see Fig. 3) in the headers B, the said bridges forming with the said tubes a continuous surface having an undulatory outline, over which the liquid flows in an unbroken thin sheet. As the liquid or substance to be treated flows down over the evaporating-surface its velocity increases according to the distance through which it passes, and the tendency of part of the liquid as it passes over the curved or rounded portions of the evaporating-surface is to leave or drop away from said surface on a tangent. To catch any liquid which may thus leave the evaporating-surface I have provided, as shown, a series of returning-surfaces, represented as shelves $n$, located below the widest portion of the evaporating-surface—that is, below each tube, as herein shown—the said returning-surfaces being preferably fitted into inclined grooves $p$ in the headers B (see Fig. 3) on opposite sides of the said tube, and, as shown in Fig. 1, being inclined toward the bridges $o$ and being separated from the said bridges and tubes so as to permit the ready or free passage of the liquid from them back onto the evaporating-surface.

Access to the evaporating-surface for cleaning or other purposes may be had by removing the returning-surfaces.

The heating agent or medium—which may be steam, caloric, hot water, or other liquid or gas, according to the nature of the substance to be concentrated, distilled, or refined—is supplied to the chamber or pocket $e$ of each section of the apparatus, as shown, by a pipe $K^{20}$, connected, as shown, to a manifold L, provided with a main inlet-pipe K, connected to the source of heat—as a steam-boiler—the pipe $K^{20}$ being provided with a cock or valve $r$, by which the said supply of heating medium may be cut off to render the said section inoperative. The heating medium is caused to circulate through the pipes or tubes in a direction preferably at a right angle to the flow of the material over the evaporating-surface, the said tubes or pipes, as above described, being preferably arranged and connected at their ends to cause the heating medium to cross and recross the apparatus one or more times, as desired.

To enable liquids to be maintained in a substantially continuous sheet for the entire length of the evaporating-surface while traversing the same, it will be necessary to supply from the feeder a quantity of material sufficient to overbalance or at least make up for the loss by evaporation while so traversing the evaporating-surface, and to do this a very considerable quantity of liquid is discharged upon the first tube of the series of tubes entering into the evaporating-surface, and the excess of liquid, falling from the same tangentially, is fed by the returning-surface next below it back to the next tube, and so on in succession, the quantity of material fed back by the last returning-surface of the series being substantially enough to just cover, as a thin film, the last tube of the series.

The heating medium, after circulating through the apparatus, may be removed therefrom by the pipe $t$. Should it be found expedient to renew the heating agent at a point intermediate to the downflow of the liquid or substance being treated, the pipe $K^{20}$, having the stop-valve or cock $r$, may be repeated, as will be understood by the representation in dotted lines, Fig. 2, a partition $s$ being interposed, and the additional drain-pipe $u$ being provided for the upper portion of the evaporating-surface.

I prefer to construct the apparatus in sections, as shown in Figs. 1, 2, and 3; but, if desired, the said apparatus may be constructed as shown in Figs. 5 to 8, inclusive, wherein the tubes or pipes A, comprising the evaporating-surface, are arranged, as shown, in vertical rows in a cylindrical shell, the said tubes or pipes being extended through and supported, as shown, by a division plate or wall $A^3$. The heads $B'$ of the cylindrical shell are divided, as shown, by vertical partitions $b^{10}$ and horizontal partitions $d$, to form chambers or pockets $a$, in a similar manner to that shown in Figs. 1, 2, and 3, the said pockets or chambers being arranged with relation to the independent rows of tubes or pipes constituting the evaporating-surface so as to form a continuous passage for the heating medium, as hereinbefore described, the heating medium being admitted through nipple $e'$ to a single chamber $e$, communicating with the uppermost row of tubes A, as shown in Fig. 5, the drainage being effected by the pipe $t'$. Each vertical row of tubes or pipes A has co-operating with it, as shown, a slotted feed or supply G, the said feed or supply communicating with a common chamber or pocket $i$, to which the liquid is supplied by the pipes H. The products of evaporation or distillation pass out of the shell by the pipe J and the products of condensation by the pipe $l$.

The construction of the evaporating-surface is capable of various modifications and yet be within the scope of my invention, as illustrated by Figs. 9 to 15, inclusive—viz., in Fig. 9 the evaporating-surface consists of tubes of increasing diameter in descending order. In Fig. 10 the surface is composed of tubes arranged in zigzag series, connected by bridges $o$, and having the returning-surfaces $n$, adapted, as shown, to cause the currents to follow the irregular course, which will serve to retard the rate of its flow. In Fig. 11 the surface consists of two sheet-metal plates having horizontally-arranged semi-tubular projections stamped in them, the said plates being riveted together. In Fig. 12 the surface consists of united corrugated-metal sheets, the form therein shown affording gradual curvatures of exterior surface, whereby the liquid will the more readily adhere to the same. In Figs. 13 and 14 the surface is composed of tubes A cast in sections, which are firmly secured to the headers B and are adapted by a pear-shaped or ovoid form to constitute a continuous flowing and maximum heating-surface. The returning-surfaces will be employed with the constructions shown in Figs. 11 to 14, inclusive; but they have been omitted from the drawings. In Fig. 15 I have omitted the bridges and have placed the tubes A substantially in contact.

In the adaptation to a vacuum evaporating or distilling system I have shown in Fig. 4 the preferred form of apparatus first described connected for multiple effect of evaporation—that is to say, utilizing the heat of the vapor constituent developed from one evaporating-surface for heating the next succeeding evaporating-surface.

Herein steam or other heating medium from a suitable source is introduced to the first evaporator $C^2$ through pipe K, the vapors of evaporation of distillation therefrom being conveyed by means of pipe $J'$ to heat the evaporating-surface in the apparatus $C^3$, while the pipe $J^2$ performs a like function between the apparatus $C^3$ $C^4$. The vapor in the last apparatus is withdrawn by the condenser and exhaust-pump M, which maintain the different degrees of vacuum in the successive apparatus necessary to produce repeated vaporization or distillation from a single source of heat, as is common in practice.

The liquid product of concentration from each apparatus is delivered from pipes $l$ to pipes H, and by these pipes to the feed or supply tubes G, Fig. 1, of each succeeding apparatus by means of suitable pumps N, and the final heavier concentrated constituent—as, for instance, a concentrated saccharine solution—is delivered by pump O. By control of the cocks $y$ $y$ and $w$ $w$ the hot condensed portions of the heating agent are withdrawn from pipes $u$ or $t$ through the discharge-pipes $u'$ $t'$, or they may be utilized in repetition by delivery through pipes $u^2$ $t^2$ to the manifolds L, to be reconverted into steam by the lower succeeding vacuum. In the diagram the double use of the evaporating-surface is represented—that is, the said surface is divided, as above described, the lower additional set of manifolds L being employed. The final condensation of steam is carried to the condenser M by pipes $u^3$ $t^3$.

My improved apparatus in practice may be employed for concentrating sugar and like solutions containing water, and in this case steam or caloric—that is, the products of combustion from a furnace or other source—may be used as the heating medium; but it is equally well adapted to be used for distilling glycerine, which requires a very high temperature, and in this case the heating medium may be oil having a high boiling-point. So, also, the said apparatus may be used for refining or distilling substances of a low boiling or volatilizing point, in which case warm water or other liquid maintained at a temperature below the boiling-point of water may be used as the heating medium.

I have herein shown the tubes or pipes connected to a number of chambers or pockets $a$, and, while I prefer this construction, I do not desire to limit my invention to the particular construction shown, as the said tubes may be connected to one or more chambers or pockets at each side of the apparatus, the said tubes when connected to a single chamber at each side of the apparatus forming a single hollow case or shell into which the heating medium is admitted.

I do not desire to limit myself to the exact construction of the feeder shown, as it may be modified in construction, so long as it delivers the liquid substance free from pressure and in a sufficient quantity to form on the evaporating-surface a substantially continuous sheet.

I am aware that it has been attempted to discharge liquid upon a spherical surface; but it is obvious that liquid flowed upon such a surface would run over the same in streaks.

By the term "evaporating," as hereinafter used in the claims, I wish it to be understood as including within its scope refining and distillation.

I claim—

1. In an apparatus for evaporating liquids and other substances, an undulatory evaporating-surface and a feed or delivery for the liquid to be treated, combined with a series of returning-surfaces co-operating with the said evaporating-surface to receive and return the liquid thereto, substantially as described.

2. In an apparatus for evaporating liquids and other substances, an undulatory evaporating-surface consisting of a series of tubes or pipes A and intervening bridges o, and a feed or supply for the liquid to be treated, combined with a series of returning-surfaces co-operating with the said surfaces to receive and return the liquid thereto, substantially as described.

3. In an apparatus for evaporating liquids and other substances, an undulatory evaporating-surface consisting of a series of tubes or pipes A and intervening bridges o, and a feed or supply for the liquid to be treated, combined with a series of returning-surfaces co-operating with the said tubes on opposite sides thereof, substantially as described.

4. In an evaporating apparatus, a plurality of independent detachable sections, each consisting of an evaporating-surface and a liquid feeder or delivery for each evaporating-surface, combined with a supply-pipe for the said sections and with a cock or valve for each section, whereby a section of the apparatus may be cut off and rendered inoperative, substantially as described.

5. The combination, with the horizontal evaporating tubes or pipes vertically ranged, as shown, of the parallel removable inclined returning-surfaces proximate to the under surface thereof, adapted to return separated portions of the gravitating liquid to the surfaces of each succeeding tube, as set forth.

6. In an evaporating apparatus, the combination, with a feeder and an undulatory evaporating-surface located below it, of the intermediate disconnected returning-surfaces, upon which the liquid from the feeder is discharged to be conducted to the evaporating-surface, substantially as described.

7. In an evaporating apparatus, a heated non-spherical evaporating-surface, combined with the herein-described liquid-feeder connected to form a continuous surface therewith and having a delivery-slot, from which the substance to be evaporated flows by a force due to gravity to spread over and so as to envelop or cover the said evaporating-surface with a liquid sheet, the said evaporating-surface and connected feeder being formed to maintain the said liquid sheet continuous or unbroken in its passage from the delivery-slot and being acted directly upon by the heating medium, whereby a maximum evaporating effect is produced, substantially as described.

8. In an evaporating apparatus, a heated non-spherical evaporating-surface, combined with the herein-described liquid-feeder connected to form a continuous surface therewith, and having a delivery-slot, from which the substance to be evaporated flows by a force due to gravity to spread over and so as to envelop or cover the said evaporating-surface with a liquid sheet, the said evaporating-surface and liquid-feeder having an undulatory outline formed to maintain the said liquid sheet continuous or unbroken in its passage and being acted directly upon by the heating medium, whereby a maximum evaporating effect is produced, substantially as described.

9. In an evaporating apparatus, a heated evaporating-surface consisting of a series of connected tubes or pipes A, arranged in substantially a vertical plane to form an evaporating-surface having an undulatory outline, and through which the heating medium is circulated, combined with the herein-described liquid-feeder connected to said evaporating-surface by an intermediate bridge and constructed to overflow the liquid upon and so as to cover the said evaporating-surface with a continuous liquid sheet, which flows over the evaporating-surface substantially at right angles to the length of the said tubes, substantially as described.

10. In an apparatus for evaporating or distilling liquids, the evaporating-surface composed of horizontal parallel tubes ranged in vertical series and successively connected with each other for a continuous flow of the liquid, and by chambers or headers for a continuous passage of the heating agent therein, in combination with an elevated feed or supply pipe parallel to and connected to said series by an intermediate bridge to form a continuous-flowing surface and adapted by a slotted opening to overflow and spread the liquid solution in a continuous sheet upon the exterior of the evaporating-surface, and with an enveloping chamber or shell for receiving and separating the vapor and liquid constituents, substantially as described.

11. In an apparatus for evaporating liquids, an evaporating-surface composed of horizontal tubes or chambers through which a heating medium is circulated, in combination with a parallel supply or feed trough located above said tubes or chambers and feed-trough, being, respectively, connected by an intermediate bridge to form a continuous face, whereby the liquid to be evaporated is spread upon said surface by the overflow of said feed-trough, and gravitates over the same in an unbroken sheet.

12. In an evaporating apparatus, a plurality of independent detachable sections, each consisting of an evaporating-surface and a surface-connected liquid feeder or delivery, as described, for each evaporating-surface, each section being constructed to be used alone or in conjunction with the remaining sections, substantially as described.

13. In an evaporating apparatus, the combination, with a series of evaporating-surfaces and a liquid feeder or delivery for each evaporating-surface, of an independently-controlled liquid-supply connected to the liquid-feeder of each evaporating-surface, whereby each evaporating-surface may be rendered inoperative independently of the others, substantially as described.

THOMAS GAUNT.

Witnesses:
CHAS. W. FORBES,
M. J. MARTINEZ.